United States Patent
Porikli et al.

(10) Patent No.: US 7,403,664 B2
(45) Date of Patent: Jul. 22, 2008

(54) TRAFFIC EVENT DETECTION IN COMPRESSED VIDEOS

(75) Inventors: Faith M. Porikli, Watertown, MA (US); Xiaokun Li, Cincinnati, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 785 days.

(21) Appl. No.: 10/787,667

(22) Filed: Feb. 26, 2004

(65) Prior Publication Data

US 2005/0190975 A1    Sep. 1, 2005

(51) Int. Cl.
*G06K 9/46* (2006.01)
(52) U.S. Cl. .................. 382/235; 382/104; 340/907; 340/933; 348/113
(58) Field of Classification Search ................ 382/235, 382/104; 340/907, 933; 348/113
See application file for complete search history.

(56) References Cited

U.S. PATENT DOCUMENTS

| | | | |
|---|---|---|---|
| 6,757,328 B1* | 6/2004 | Huang et al. ............. | 375/240.1 |
| 2002/0028021 A1* | 3/2002 | Foote et al. ................. | 382/224 |

OTHER PUBLICATIONS

Bernard C. Levy et al.; High-level primitives for recursive maximum likelihood estimation;IEEE vol. 41, No. 8, Aug. 1996, 1125-1145.*

J. Boyd, J. Meloche, Y. Vardi, "Statistical Tracking in Video Traffic Surveillance," IEEE Int. Conf. On Computer Vision 99, Corfu, Greece, Sep. 1999.

D. Beymer, P. McLauchlan, B. Coifman, J. Malik, "A Real-time computer vision system for Measuring Traffic Parameters," In CVPR, pp. 495-501, 1997.

J. M. Ferryman, S. J. Maybank, A. D. Worrall, "Visual Surveillance for Moving Vehicles," International Journal of Computer Vision, pp. 187-197, 2000.

H. Taniguchi, T. Nakamura, H. Furusawa, "Methods of Traffic Flow Measurement using Spatio-Temporal Image," In ICIP, pp. 16-20, 1999.

Shunsuke Kamijo, Yasuyuki Matsushita, Katsushi Ikeuchi, and Masao Sakauchi, "Traffic Monitoring and Accident Detection at Intersections," IEEE Transactions on Intelligent Transportation Systems, vol. 1, No. 2, pp. 108-118, 2000.

O. Masoud, N. Papanikolopoulos, "A Novel Method for Tracking and Counting Pedestrians in Real-Time Using a Single Camera," IEEE Transactions on Vehicular Technology, vol. 50, No. Sep. 2001.

I. Masaki, "Machine-vision System for Intelligent Transportation: The Autoscope system," IEEE Transactions Vehicle Technology, vol. 40, pp. 21-29, 1991.

L. Zelnik-Manor, M. Irani, "Event-Based Analysis of Video," In CVPR, II pp. 123-130, 2001.

(Continued)

*Primary Examiner*—Vikkram Bali
*Assistant Examiner*—Eueng-Nan Yeh
(74) *Attorney, Agent, or Firm*—Dirk Brinkman; Clifton D. Mueller; Gene V. Vinokur

(57) ABSTRACT

A method detects traffic events in a compressed video. Feature vectors are extracted from the compressed video. The feature vector are provided to a Gaussian mixture hidden Markov model. Then, a maximum likelihood of the Gaussian mixture hidden Markov model is determined to classify the plurality of feature vector as traffic events.

14 Claims, 5 Drawing Sheets

OTHER PUBLICATIONS

F. Dellaert, D. Pomerleau, C. Thorpe, "Model-based car tracking integrated with a road follower," In Proceedings International Conference on Robotics and Automation, pp. 1189-1194, 1998.

Young-kee Jung, Kyu-Won Lee, and Yo-Sung Ho, "Content-Based Event Retrieval Using Semantic Scene Interpretation for Automated Traffic Surveillance," IEEE Transactions on Intelligent Transportation Systems, vol. 2, No. 3, pp. 151-163, 2001.

Gerard Medioni, Isaac Cohen, Francois Bremond, Somboon Hongeng, and Ramakant Nevatia, "Event Detection and Analysis from Video Streams", IEEE Trans. PAMI, vol. 23, No. 8, pp. 873-889, 2001.

S. Kamujo, Y. Matsubhita, K. Ikeuchi, M. Sakauchi, "Traffic Monitoring and Accident Detection at Itersections," IEEE Transactions on Intelligent Transportation Systems, vol. 1, No. 2 Jun. 2000.

D. Koller, J. Weber, T. Huang, J. Malik, G. Ogasawara, B. Rao, S. Russell, "Towards Robust Automatic Traffic Sence Analysis in Real-time," In ICPR, pp. 126-131, 1994.

J. Kato, et al., "An HMM-Based Segmentation Method for Traffic Monitoring Movies," IEEE Trans. PAMI, pp. 1291-1296, 2002.

K. Pyun, et al., "Robust Image Classification Based on A Non-Causal Hidden Markov Gauss Mixture Model," In ICIP, pp. 785-788, 2002.

* cited by examiner

400

| Symbol | Value |
|---|---|
| P | The value for the highest likelihood |
| D | The distance between the highest Likelihood and the second highest likelihood |
| S | Previous result. If previous result is equal to Current result $S = 1$, else $S = 0$ |

600
FIG. 6

TRAFFIC EVENT DETECTION IN COMPRESSED VIDEOS

FIELD OF THE INVENTION

This invention relates generally to detecting events in videos, and more particularly to classifying the events based on features extracted from compressed videos.

BACKGROUND OF THE INVENTION

In intelligent transportation systems, computer vision and artificial intelligence techniques are applied to traffic data. The traffic data can be acquired by various sensors, see Masaki, "Machine-vision System for Intelligent Transportation: The Autoscope system," IEEE Transaction Vehicle Technology, Vol. 40, pp. 21-29, 1991. Traffic management and control also rely on sensors for real-time traffic parameter estimation. The dominant technologies for current traffic management systems are loop detectors and pneumatic sensors placed in or on roads to count individual passing vehicles.

Video monitoring systems have more advantages, see Beymer et al., "A Real-time computer vision system for Measuring Traffic Parameters," CVPR, pp. 495-501, 1997. First, more traffic parameters can be estimated. Second, cameras are less disruptive and less costly to install than loop detectors and pneumatic sensors. For vision-based traffic surveillance system, the cameras are usually mounted on poles or other tall structures looking down at the road. Traffic conditions are captured and digitized into compressed videos, e.g., MPEG. The compressed videos are transmitted to a transportation management center (TMC) for multi-channel statistical analysis and event detection. Beymer uses a grouped sub-feature set to overcome the difficulty of vehicle tracking in congested traffic.

Most computer vision-based systems for monitoring traffic rely on stationary cameras, and inspect traffic by tracking vehicles passing through the field of view of the cameras. In one system, vehicles are located and tracked in 3D as the vehicles move across a ground plane. Trajectories are classified, while taking into account occlusions of vehicles by stationary parts of the scene or occlusions between vehicles, see Sullivan, "Model-based Vision for Traffic Scenes using the Ground-plane Constraint," In Real-time Computer Vision, D. Terzopoulos and C. Brown (Eds.), Cambridge University Press, 1994.

Another system uses a contour tracker and affine motion model-based Kalman filters to extract vehicle trajectories. A dynamic belief network is used to make inferences about traffic events, see Koller et al., "Towards Robust Automatic Traffic Scene Analysis in Real-time," ICPR, pp. 126-131, 1994.

Another system detects vehicles in urban traffic scenes by means of rule-based reasoning on visual data, see Cucchiara et al., "Image Analysis and Rule-Based Reasoning for a Traffic Monitoring System," IEEE Transactions on Intelligent Transportation Systems, Vol. 1, No. 2, pp. 119-130, 2000. Six types of traffic events are defined and tested in their system.

Kamijo et al., in "Traffic Monitoring and Accident Detection at Intersections," IEEE Transactions on Intelligent Transportation Systems, Vol. 1, No. 2, pp. 108-118, 2000, describe an extensible traffic monitoring system for traffic detection at intersection. They use three types of traffic events and a discrete HMM.

Traffic monitoring and vehicle tracking can also be done with a camera mounted on a moving vehicle, see Ferryman et al., "Visual Surveillance for Moving Vehicles," International Journal of Computer Vision, pp. 187-197, 2000, Dellaert et al., "Model-based car tracking integrated with a road follower," Proceedings International Conference on Robotics and Automation, pp. 1189-1194, 1998, Dikmanns, "Vehicles Capable of Dynamic Vision," Proceedings International Joint Conference on Artificial Intelligence, pp. 1577-1592, 1997, and Zhao et al., "Qualitative and Quantitative Car Tracking from a Range Image," CVPR, pp. 496-501, 1998. Zhao et al. construct three motion models that are incorporated into extended Kalman filters to perform quantitative tracking and motion estimation of both the camera and the vehicles. Dellaert et al. model a vehicle by a box and design a filter to estimate parameters such as vehicle position and dimensions, road curvature and width, vehicle motion, direction and speed, and camera motion. Ferryman et al. estimate the camera motion by matching features on the ground plane from one image to the next. Then, vehicle detection and hypothesis generation is performed using template correlation and a 3D wire frame model of the vehicle is fitted to the image. After vehicle detection and identification, the vehicles are tracked using dynamic filtering.

A rear-end-collision prevention system uses a directional-temporal transform (DTT). That system transforms spatio-temporal image onto a directional-temporal plane, see Jung et al., "Content-Based Event Retrieval Using Semantic Scene Interpretation for Automated Traffic Surveillance," IEEE Transactions on Intelligent Transportation Systems, Vol. 2, No 3, pp. 151-163, 2001.

A non-parameter regression (NPR) method can be used to forecast traffic events from a signal curve extracted from a moving area, see Shuming et al., "Traffic Incident Detection Algorithm Based on Non-parameter Regression," IEEE International Conference on Intelligent Transportation Systems (ITS), pp. 714-719, 2002.

Another system uses a multi-level approach, optical flow, Kalman filtering, and blob merging for monitoring traffic, see Maurin et al., "Monitoring Crowded Traffic Scenes," IEEE International Conference on ITS, pp. 19-24.

Another system extracts traffic information from an MPEG compressed video, and uses a ratio between moving blocks and all blocks to estimate traffic conditions, see Yu et al., "Highway Traffic Information Extraction from Skycam MPEG Video," IEEE International Conference on ITS, pp. 37-41, 2002.

It is desired to analyze large traffic scenes. Such analysis can yield more information than traditional sensor based systems that detect only single instances of passing vehicles.

SUMMARY OF THE INVENTION

Detecting events in vehicle traffic is important in monitoring and managing traffic flow. The invention provides a real-time and low-cost system for automatic traffic event detection in a compressed video.

Unlike prior art system, the system according to the invention uses a Gaussian mixture hidden Markov model (GM-HMM) to detect traffic events. Event features are extracted directly from an MPEG compressed video.

The method according to the invention constructs a multi-dimensional feature vector from encoded data. Geometric corrections are applied to the extracted features.

As an advantage, the feature vector describes accurately a motion energy distribution which changes along the time axis. The feature vector captures the texture properties of the underlying macro-block of frame effectively. As another important advantage, the feature vector is invariant to different scenes, i.e., streets, roads, highways, and illumination conditions, e.g., sunny, cloudy, and dark.

In the system based on GMHMMs, multiple different traffic event patterns in the HMM chains are learned, for example, five. Maximum likelihood estimation detects events from outputs of the HMM chains. Furthermore, confidence score for the events are determined and evaluated.

The system is efficient in terms of computational load. Also, the model-based system can be extended easily to recognize additional events by adding new patterns into a training data set. Experimental results show that the system has a high accurate detection rate and capable of processing more than six-channels of video steams at 30 Hz and 352×240 resolution on a 2.8 GHz Pentium-P4 personal computer (PC) in real-time.

BRIEF DESCRIPTION OF THE DRAWINGS

FIG. 6 is a table of confidence values according to the invention.

DETAILED DESCRIPTION OF THE PREFERRED EMBODIMENT

The system according to our invention acquires multi-channel videos of traffic scenes from different monitoring points. The compressed videos are transmitted to a traffic management center. In order to reduce the burden of traffic engineers, we provide a real-time and low-cost system to automatically detect traffic events, e.g., heavy congestion, light congestion, and open roads, from the compressed videos.

Instead of detecting or tracking individual vehicles, as in the prior art, we extract event features directly from the compressed videos and construct event models. Because the event features are extracted in the compressed data domain without decoding the compressed video, the computational load is very low. Thus, multiple videos can be processed concurrently in real-time on a convention PC.

Because most current traffic videos are encoded according to the MPEG-1 standard, our method is based on this standard. However, it should be understood, that other video encoding standards, such as MPEG-2 and MPEG-4, H263 and H.23xx standards, can also be used.

Extracting feature from compressed videos provides several advantages over methods that decode the compressed videos to the spatial domain before feature extraction and motion detection. First, substantially less processing is required. Second, because the compressed video contains a lot of useful information, such as spatial energy, texture, edges, average color, motion information, it is unnecessary to decode the video and perform object and motion detection in the spatial domain for event detection purposes. We combine the spatial energy, texture, edges, average color and motion information available in compressed video to construct a multi-dimensional feature vector. We also provide a seven-dimensional feature vector format.

Traffic events can be modeled as a stochastic temporal process. The features of the model, at multiple temporal scales, are samples of the stochastic process. The features can be used to construct an empirical distribution associated with the events.

A hidden Markov model (HMM) is suitable for a stochastic process such as vehicle traffic due to the continuity property of traffic events. Specifically, we use Gaussian mixture HMM (GMHHM) for modeling traffic events in our system.

System Structure

Figure 1:
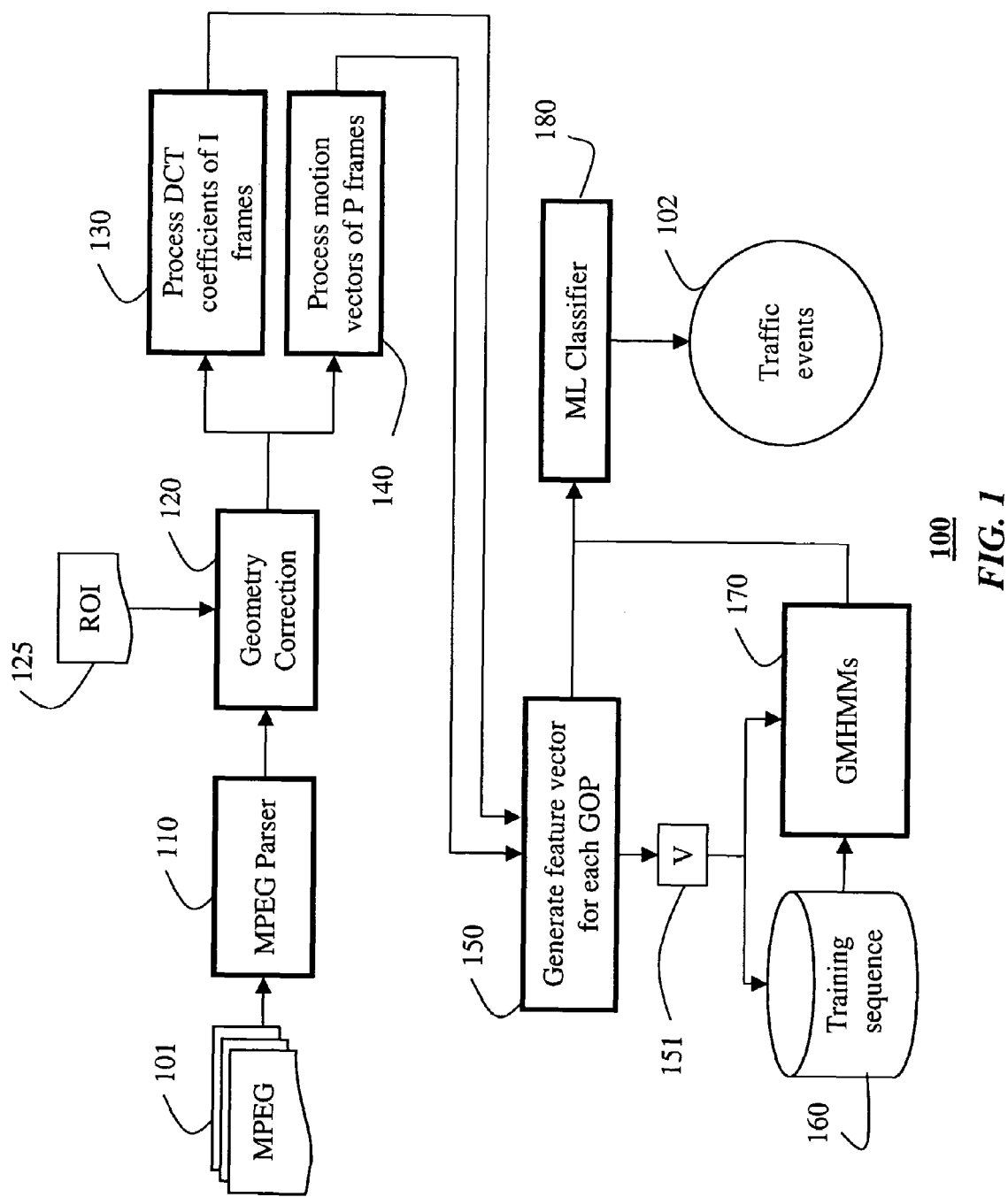
FIG. 1 is a block diagram of a traffic detection system and method according to the invention.
Figure 3:
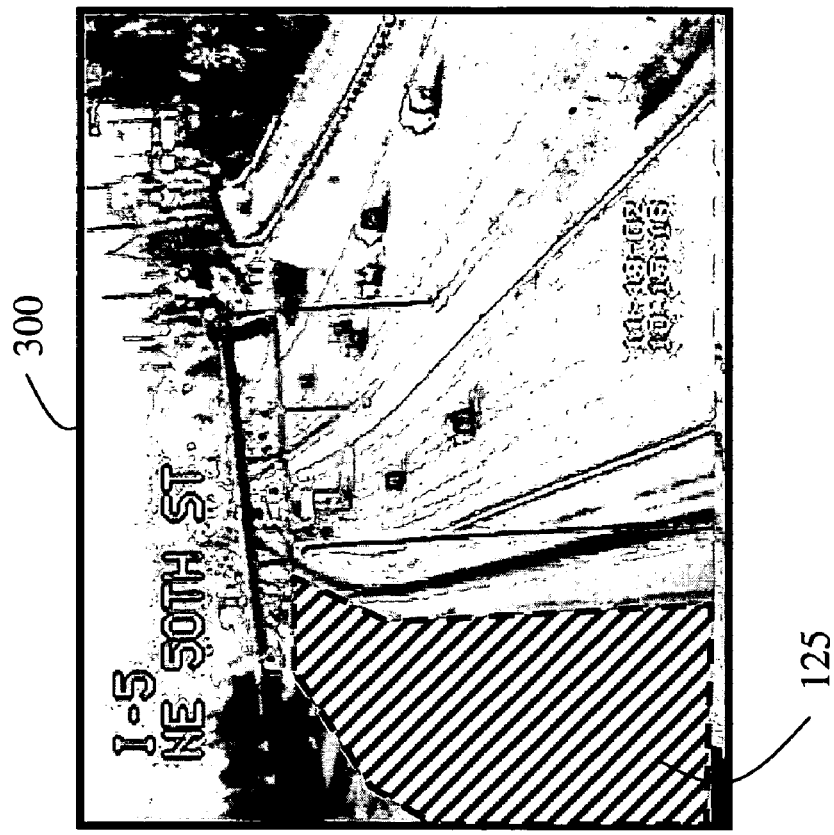
FIG. 3 is a single spatial image of a traffic video, and a single region of interest.

As shown in FIG. 1, an input to our system is a MPEG compressed video bitstream 101. The bitstream is parsed 110 and only the discrete cosine transforms (DCT) coefficients and motion vectors (MVs) in a region of interest (ROI) 125, i.e., the road and vehicles on the road, are retained. Geometry correction 120 is applied to transform from camera to real-world coordinates. Residues of the DCT coefficients in the I-frames are determined 130, and the MVs are processed 140.

A feature vector (V) 151 is generated 150 from the processed DCT coefficients 130 and MVs 140 for each group of pictures (GOP). In MPEG-1, the GOP rate is two GOPs per second. One GOP is equal to one time instance for each feature vector.

For training purpose, the feature vectors are labeled and stored as a training sequence 160 to train the GMHHM 170. The labeling is according to event classification described below.

For detecting purposes, the unlabeled feature vectors are passed to the trained GMHMM and a maximum likelihood classifier 180 is used to detection traffic events 102.

These steps are now described in greater detail.

MPEG Parser

MPEG compression scheme reduces the spatial redundancy in one frame by using discrete cosine transform (DCT) and temporal redundancy between successive frames via motion compensation to achieve a low-bit rate compression. The result of motion compensation is stored as motion vector in video.

An MPEG video consists of a sequence of intra-coded I frames with a number of B and P frames, where a P frame is predicted from the immediately preceding I or P frame, and a B frame is bidirectionally interpolated using the two I or P frames before and after it. The basic unit of a sequence is group of pictures (GOP) and its typical encoding order is: I B B P B B P B B P B B P. We only use the I and P frames since B frame information is already contained within the I and P frames.

The parser converts the binary bit-stream into the corresponding DCT coefficients of I-frames and MV's of P-frames.

Spatial Energy, Texture, and Edge Features

A DCT compressed video encodes a 2D image using DCT coefficients $\{C_{uv}\}$ of a N×N image region $\{I_{xy}, 0 \leq x < N, 0 \leq y < N\}$ as $$C(u, v) = \frac{1}{N} K_u K_v \sum_{x=0}^{N-1} \sum_{y=0}^{N-1} I_{xy} \cos\frac{\pi u(2x+1)}{2N} \cos\frac{\pi v(2y+1)}{2N}, \quad (1)$$

where u and v are horizontal and vertical frequencies (u, v=0, 1, ..., N−1), N=8, and $$K_u = K_v = \frac{1}{\sqrt{2}}.$$

Figure 2:
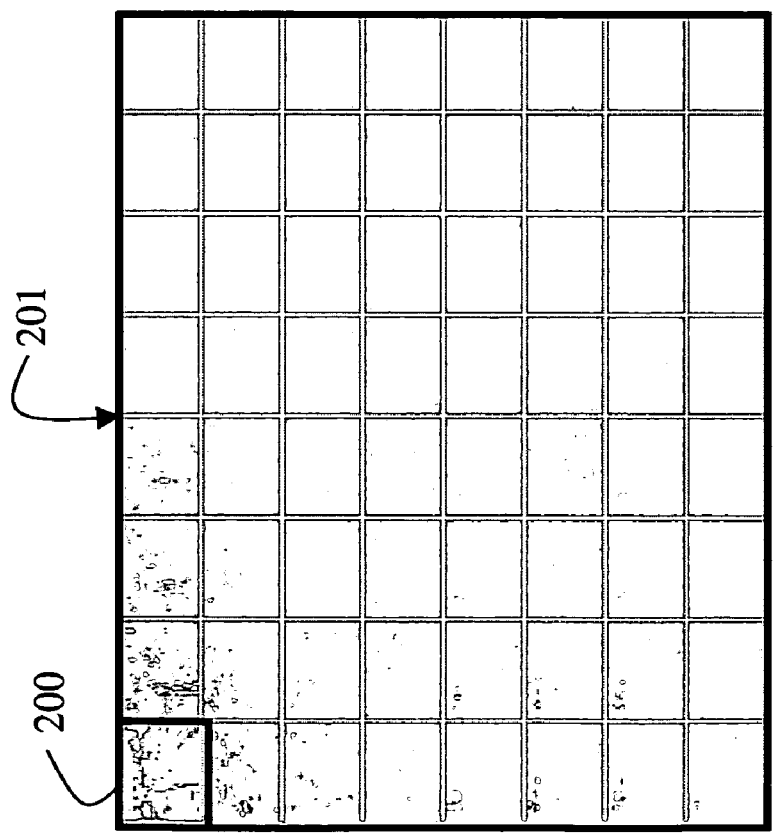
FIG. 2 is an array of DCT blocks in an image of a traffic video.

When u=v=0 and $K_u$=$K_v$=1, the coefficient is called the DC parameter or image energy, and the coefficient is considered as a color average of the corresponding color channel, i.e. Y, U, or V. A variable DC(i, j, t) represent the DC parameter of a block (i, j) for a GOP t. The DC parameter is actually a ⅟64 reduced image 200 from spatial image. Other DCT coefficients, when u=1, ..., N−1, or, u=1, ..., N−1 are called as AC coefficients. The AC coefficients describe the spatial frequencies and directionality and are distributed in the 8×8 blocks of the DCT block matrix shown in FIG. 2, except for the top-left block 200.

Because the main texture and edge information is located in the first column and first row, we only use a predetermined number of lower indexed DCT coefficients to compute an AC mean value $$\overline{AC} = \frac{1}{2M} \sum_{m=1}^{M} (C(m, 0) + C(0, m)), \quad (2)$$

where M≦N is the highest frequency number. In our method, M=4. We use a directional Sobel filter to obtain a clear texture and edge map having a size that is also ⅟64 of the spatial image 300.

Note that DC and AC mean features only exist in I-frames. It is also possible to use only the Y channel data, which contains the most energy and gray information of the video.

Motion Vector

MVs only exit in P and B-frames. There is one MV for each block. The MVs in the P-frames have the following properties. First, a moving area in the P-frame, where MVs are larger than zero, corresponds to a moving object in the spatial domain. Second, the average direction of the majority MVs in the moving area reflects the motion direction of that object and the average magnitude of the MVs indicates the velocity of the object. To obtain a reliable MV, a constrained mean filter is used to remove noise $$MV(i, j) = \frac{1}{L-2} \sum_{m=2}^{L-1} SortedMV(i, j, m), \quad (3)$$

where SortedMV (i,j,m)∈{the eight neighbors of MV(i,j)}, L=9.

Note that before acquiring the feature information of image energy, texture and edges, and MV, a predefined ROI mask is applied to the DCT coefficients and MVs. A ROI corresponds to a traffic lane. Since the camera is stationary, this region is identified and marked once at the beginning. Only the coefficients and MVs within the ROI are used and the other coefficients are discarded when the feature vector is extracted. Thus, only DCT coefficients and MVs within a ROI 125 are processed, the others are set to zero.

Geometry Correction

To make the feature extraction more accurate and invariant to different data sources, geometry correction 120 is applied to the feature data to enable one universal set of parameters for all traffic scenes, regardless of scale or viewing angle.

First, an affine transformation with rotation matrix R and a translation vector T transforms the feature data in the camera coordinate system to the reference coordinate system.

$$V_e = RV_s + T, \quad (4)$$

where $$V_s = \begin{pmatrix} x \\ y \end{pmatrix}$$

is the original source data, $$V_e = \begin{pmatrix} x \\ y \end{pmatrix}$$

is the transformed data, $$R = \begin{pmatrix} \cos\theta & \sin\theta \\ -\sin\theta & \cos\theta \end{pmatrix},$$

θ is the angle between the road direction and the Y-axis of the reference coordinate system, $$T = \begin{pmatrix} D_x \\ D_y \end{pmatrix},$$

and T is the Euclidean distance between the center of the ROI and the reference coordinate system. By this transformation, the motion vectors of each ROI have the same direction and are centered on the origin of the reference system. Note that, before this transformation the motion vectors within two separate ROI, which correspond to two opposite traffic lanes, have opposite directions.

Then, an area based scaling is applied to the spatial energy, texture, and MVs along the y-axis of the reference coordinate system, which corresponds to the z-axis of the camera coordinate system before the affine transformation. As a result of perspective projection, the size of a visible road segment within the image macro-blocks becomes smaller and the speed of a vehicle within such a block becomes slower. Thus, the corresponding motion vector has a smaller magnitude. To compensate for this effect, we scale the MV's. This compensation assigns the weight parameters to the blocks within the ROI such that the contributions of blocks are proportional with respect to their distances from the camera imaging plane. For instance, the MV's of two blocks that show closer and faraway areas of the road will become identical in case the speed of traffic flow remains the same on corresponding parts of the road. Note that, before this compensation, the motion vectors have different magnitudes because vehicles appear smaller in distance, thus their motion vectors are also smaller.

To obtain the z-axis of the camera coordinate system, camera calibration parameters are obtained interactively by using a rectangular grid. The grid is adjusted until a projection of the grid lines coincide with road markings in the real world.

Feature Vector

Traffic congestion is defined by two important properties: a speed of the traffic and a density of the traffic. Therefore, we design our feature vector such that it captures the speed and density of vehicles accurately. Our feature extraction aims to describe accurately changing traffic conditions for different data sources and illumination. For each ROI, a seven-dimensional density feature vector is constructed to describe the motion energy distribution at every time instance.

For each ROI of a GOP, a single feature vector is constructed, as follows.

Moving Energy: We determine 130 a rate of the residues of two neighboring DCs, which are parsed from two neighboring I-frames $$R_{dc} = \frac{P_{dc}}{P} \sum_{i,j \in ROI} |DC(i, j, t) - DC(i, j, t-1)|, \quad (5)$$

where $P_{dc}$ is number of pixels having a residue is larger than zero, P is the total number of pixel in the ROI. This component represents the average difference of the DC parameters and it indicates the density and speed of the traffic. This component becomes large for higher speeds and a larger number of vehicles.

Moving texture and Edge: We determine a rate of the residues of two neighboring $\overline{AC}$ s as $$R_{ac} = \frac{P_{ac}}{P} \sum_{i,j \in ROI} |\overline{AC}(i, j, t) - \overline{AC}(i, j, t-1)|, \quad (6)$$

where $P_{ac}$ is number of pixels having a residue larger than zero, P is a total number of pixel in the ROI.

Mean and Variance of MVs: Determine 140 the mean and variance of the MVs from four P-frames in one GOP.

Mean of MVs for Three bands: We also classify the magnitudes of the MVs into three bands (high, middle, and low), and determine the mean for each band.

Thus, the seven-dimensional feature vector 151 is $$V = [R_{ac} R_{dc} \overline{M}_{mv} VAR_{mv} H_{mv} M_{mv} L_{mv}]^T. \quad (7)$$

One important advantage of our feature vector is the motion energy distribution, which changes in a temporal direction. The motion energy distribution is described accurately by the feature vector 151. Furthermore, because all components in the feature vector are density parameters, the vector is invariant to a size of the region of interest. As another advantage, the density parameters are insensitive to different illuminations.

Event Modeling and Detection

Because traffic events are a stochastic temporal process and a HMM can incorporate temporal continuity, many modeling applications use the HMM, e.g., speech recognition. The HMM is also used for computer vision applications such as image classification, object tracking and recognition, and human behavior understanding in video sequences. We use GMHMMs for traffic event modeling and detection.

Gaussian Mixture HMM (GMHMM)

The HMM includes a finite set of states. Each state is associated generally with a multi-dimensional probability distribution function. Transitions among the states are governed by a set of transition probability functions. In a particular state, an outcome or observation can be generated according to the associated probability distribution. Only the outcome can be observed, while the states remain hidden.

Because traffic events according to the invention are considered as a stochastic process, we use a continuous HMM, where a profile of the probability density function (PDF) in each state is a mixture of Gaussian functions.

GMHMM

The parameters of the HMM can be expressed as $$\lambda = \{A, B, \pi\},$$

where an initial state distribution is $\pi = \{\pi_1 \ldots \pi_i \ldots \pi_N\}$, $\pi_i = P(q_1 = i)$ for $1 \leq i \leq N$, N is the number of hidden states, $q_1 = I$, the $i_{th}$ state at time $t=1$, a state transition matrix is $$A = \begin{pmatrix} a_{11} & \ldots & \ldots & \ldots & a_{1N} \\ \ldots & \ldots & \ldots & \ldots & \ldots \\ \ldots & \ldots & a_{ij} & \ldots & \ldots \\ \ldots & \ldots & \ldots & \ldots & \ldots \\ a_{N1} & \ldots & \ldots & \ldots & a_{NN} \end{pmatrix},$$

where $a_{ij} = P(q_{t+1} = j | q_t = i)$ for $1 \leq i, j \leq N$, an observation probability distribution is $B = [b_1(v) \ldots b_i(v) \ldots b_N(v)]$, where in state j:

$$b_i(v) = P(v_t | q_t = i),$$

$$b_i(v) = \frac{1}{\sqrt{(2\pi)^2 \det(\Sigma i)}} e^{-\frac{1}{2}(v - \mu_i)^T \Sigma^{-1}(v - \mu_i)},$$

V is the feature vector, the mean vector is denoted by $$\mu_i = (\mu_1^i \ldots \mu_j^i \ldots \mu_M^i),$$

$$\sum i = \begin{pmatrix} \sigma_{11}^i & \ldots & \ldots & \ldots & \sigma_{1M}^i \\ \ldots & \ldots & \ldots & \ldots & \ldots \\ \ldots & \ldots & \sigma_{kl}^i & \ldots & \ldots \\ \ldots & \ldots & \ldots & \ldots & \ldots \\ \sigma_{M1}^i & \ldots & \ldots & \ldots & \sigma_{MM}^i \end{pmatrix}, \text{ and}$$

where M is the number of Gaussian function in the mixture.

Expectation Maximization

The unknown parameters of the GMHMM are learned by using expectation maximization (EM) process. EM performs an iterative computation of maximum likelihood estimations when the observed data are incomplete. The aim of parameter learning is to find the model parameter λ that maximizes λ=arg max(log[p(V|λ)]) for a given set V 151 of observed data. Specifically, we use the well known Baum-Welsh EM process to learn the traffic event model parameters.

The learning process produces a sequence of estimates for λ. For a given set of observed data V, the estimate $\lambda_i$ has a greater value of log[p(V|λ)] than a previous estimate $\lambda_{i-1}$.

The EM process includes two parts, preliminaries and update rules. The preliminaries include $$\zeta_t(i, j) = P(q_t = i, q_{t+1} = j | V, \lambda) \quad (8)$$

$$\gamma_t(i) = P(q_t = i | V, \lambda), \quad (9)$$

where $V = \{v_1, \ldots, v_T\}$ is the training sequence 160, T is the length of training sequence, and $\zeta_t(i, j)$ and $\gamma_t(i)$ can be determined efficiently by a forward-backward process, see Rabiner, "A Tutorial on Hidden Markov Models and Selected Applications in Speech Recognition," Proceedings of The IEEE, pp. 257-286, 1989.

The update rules are $$\bar{\pi}_i = \gamma_1(i), \quad (10)$$

$$\bar{\mu}_i = \frac{\sum_{t=1}^{T} v_t \gamma_t(i)}{\sum_{t=1}^{T} \gamma_t(i)}, \quad (11)$$

$$\bar{\Sigma}_i = \frac{\sum_{t=1}^{T} \gamma_t(i)(v_t - \bar{\mu}_i)(v_t - \bar{\mu}_i)^t}{\sum_{t=1}^{T} \gamma_t(i)}, \text{ and} \quad (12)$$

$$\bar{a}_{ij} = \frac{\sum_{t=1}^{T} \zeta_t(i, j)}{\sum_{t=1}^{T-1} \gamma_t(i)}. \quad (13)$$

After setting the initial value to λ, the parameter estimation repeats Equations (8-13) until the log[p(V|λ)] reaches a local maximum.

As an advantage, the EM process always convergence in a relatively short time, for example, ten iterations or less. The local maximum is usually an adequate model for the data.

HMM Topology

Figure 4:
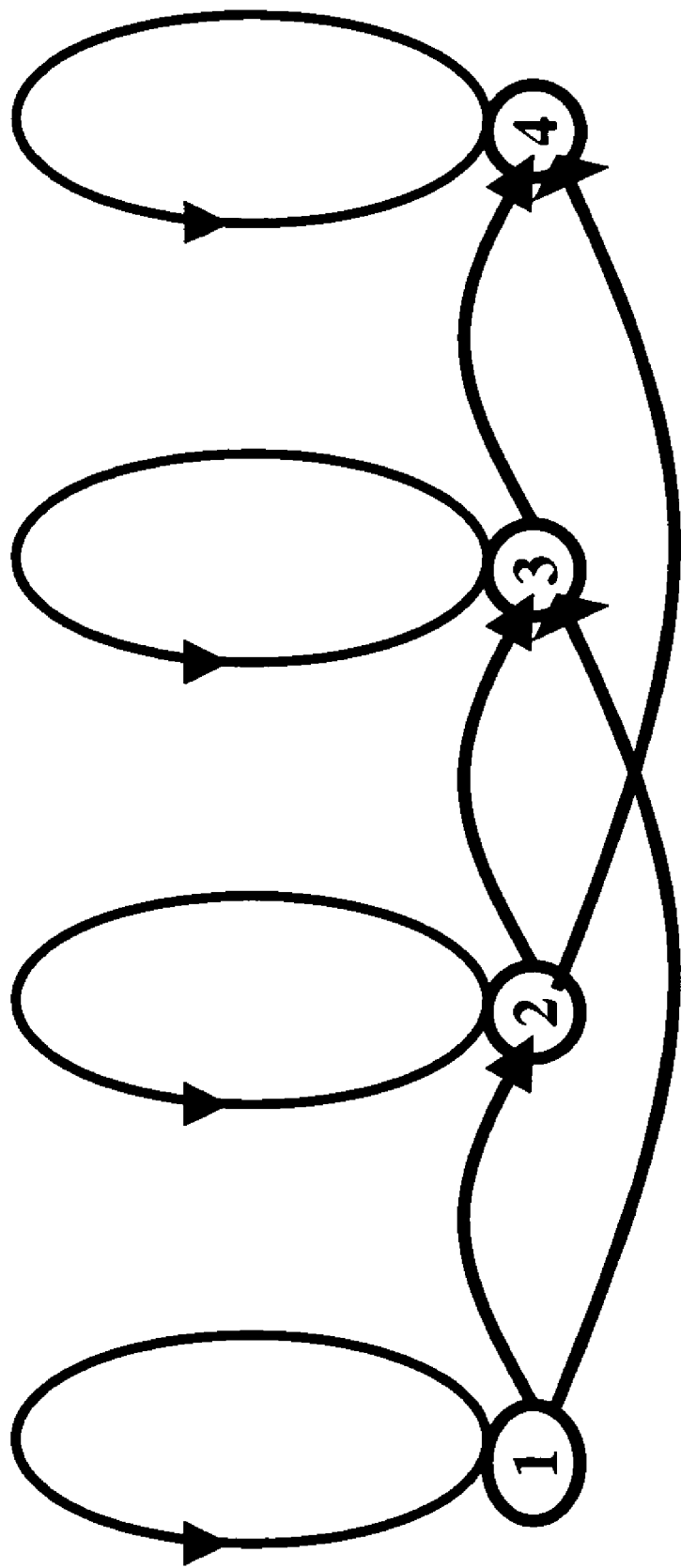
FIG. 4 is a Gaussian mixture hidden Markov model according to the invention.

As shown in FIG. 4, we use a left-to-right model 400, with four states 1-4, for example, instead of the Rabiner ergodic model. We can use other HMM topologies, different, number of states and different number of Gaussian models in the mixture to detect traffic events using the described feature vectors and framework. As an advantage, our model associates time with model states in a fairly straightforward manner, and the model is computationally efficient.

Event Definition

Traffic patterns can be roughly categorized into two states, open and congestion. However, to provide a more detailed understanding, we provide five traffic patterns, super congestion (SC), heavy congestion (HC), light congestion (LC), open, and near empty (NE).

Super Congestion: Vehicles in the ROI are bumper-to-bumper and run very slowly, e.g., less than 3 mile/hour, or are completely stopped.

Heavy Congestion: The vehicles in the ROI are crowded and run slowly, under 10 mile/hour.

Light Congestion: Most vehicles run at less than half the normal speed.

Open: Vehicles run at normal speed.

Near empty: There are less than four to five vehicles in the ROI.

Maximum Likelihood (ML) Classifier

Figure 5:
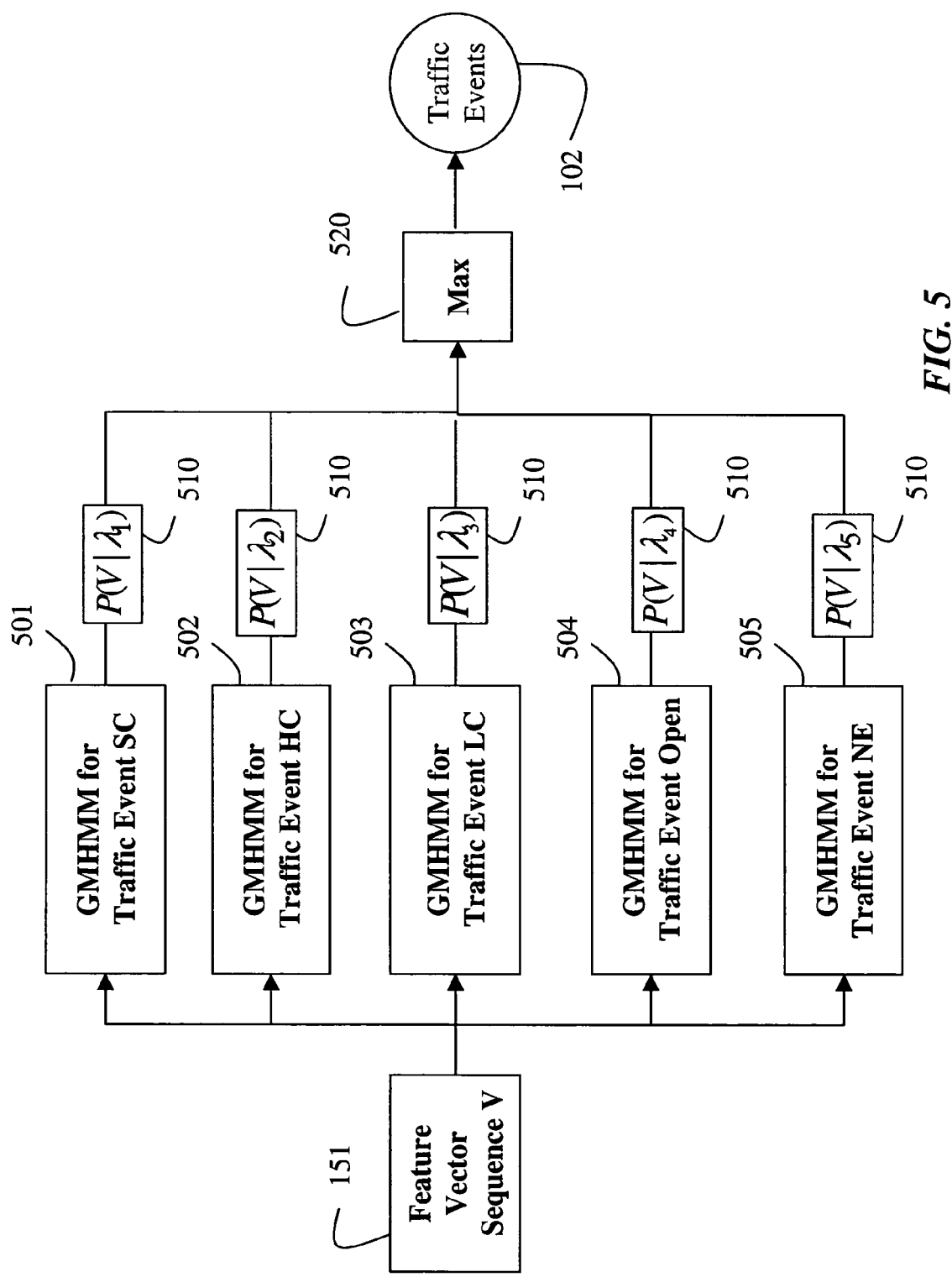
FIG. 5 is a block diagram of a classifier according to the invention.

As shown in FIG. 5, five GMHMMs 501-505 are trained respectively for the five predefined event classes. For SC, HC, LC, and NE, the HMMs are trained with four states and two Gaussian mixtures, and the HMM for OPEN is trained with eight states and three Gaussian mixture. The ML classifier 180 is designed to detect the traffic events.

The real-time input sequence V of feature vectors 151 is provided to the trained HMMs 501-505. The most likely sequence of states, and the corresponding likelihood P(V|λ_i) 510 for each class i are determined using either a trellis or Viterbi process. Finally, the class with the maximum likelihood 520 is selected to determine the traffic event 102.

Initialization $$\alpha_1(i) = \pi_i b_i(v_1) \quad 1 \leq i \leq N \quad (14)$$

Induction $$\alpha_{t+1}(j) = \left(\sum_{i=1}^{N} \alpha_t(j) a_{ij}\right) b_{ij}(v_{t+1}), 2 \leq t \leq T, 1 \leq j \leq N \quad (15)$$

Termination $$P(V | \lambda) = \sum_{j=1}^{N} \alpha_T(j) \quad (16)$$

Confidence Scoring

Due to the stochastic property of traffic conditions, errors are possible in the detection process, especially when traffic conditions change rapidly. Furthermore, the traffic classification is not completely objective. Therefore, we provide a confidence score. The confidence score is low for erroneous events, and high for correct events.

FIG. 6 shows confidence values 600 according to the invention. These values were determined by observing the operation of our system on real data. The value P of likelihood indicates a relative correctness. Higher values are more correctness. The distance D between the highest likelihood and the second highest likelihood also is an indicator of correctness. The value S reflects whether successive traffic events are continuous.

A set of weights is assigned to the value set 600. The weights can be determined by any known boosting method, see Duda et al., Pattern Classification, WSE Wiley, 2000. The confidence score can be obtained from $$CS_t = W \cdot V, \quad (17)$$

where $W=(w_1\ w_2\ w_3)$ is the set of weights normalized by $$W \leftarrow \frac{W}{\|W\|},$$

and $V_t=(P_t, D_t, S_{t-1})$ is the confidence value set at time t.

Results

Our results based on videos of real traffic scenes indicate that our system is more sensitive than the human eye. The correct detection rate can reach 97%. For traffic scenes, in which the traffic condition changes slowly, the correct rate improves to 98% for the initial output and to 99% for median filtered output. We also find that the confidence score becomes lower in case of a false alarm, which indicates an inaccurate estimation.

EFFECT OF THE INVENTION

Our system detects traffic events directly from features extracted from a compressed MPEG video in real-time. The system uses a set of GMHMMs to model traffic conditions. Events are detected using a ML classifier. The feature vector is invariant to changing illumination. Geometry correction can be applied to make the system invariant to different signal sources and camera set-ups. Our real-time, low-cost system can detect traffic events with a high degree of accuracy. Furthermore, confidence scores assist users of the system to interpret the results. Our model-based system can be easily extended for detecting additional traffic events in a variety of scenes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting traffic events in a compressed video, comprising:
    extracting a plurality of feature vectors from the compressed video, in which each feature vector includes a motion energy based on the image energy, a moving texture based on the spatial frequencies, a mean of the motion vectors, a variance of the motion vectors, mean magnitudes of the motion vectors classified into a plurality of bands;
    providing the plurality of feature vector to a Gaussian mixture hidden Markov model; and
    determining a maximum likelihood of the Gaussian mixture hidden Markov model to classify the plurality of feature vector as traffic events, in which the plurality of feature vectors are extracted from a region of interest in the video.

2. The method of claim 1, in which there is one feature vector for each group of pictures of the compressed video.

3. The method of claim 2, in which one feature vector is extracted from each group of pictures that includes at least one I-frame and at least one P-frame, and wherein the I-fame includes DCT coefficients and the P-frame includes motion vectors.

4. The method of claim 3, in which the feature vector includes the DCT coefficients that encode spatial texture frequencies of the I-frame, and the feature vector includes the motion vectors that encode direction of motion of objects in P-frame.

5. The method of claim 4, further comprising:
    applying a constrained mean filter to the motion vectors to remove noise.

6. The method of claim 1, further comprising:
    transforming the feature vectors from a camera coordinate system to a reference coordinate system.

7. The method of claim 1, in which each component of each feature vector is a density parameter invariant to a size of the region of interest and illumination.

8. The method of claim 1, further comprising:
    training the Gaussian mixture hidden Markov model with labeled feature vectors.

9. The method of claim 1, in which the Gaussian mixture hidden Markov model includes a finite set of states, and each state is associated with a multi-dimensional probability distribution function.

10. The method of claim 8, in which unknown parameters of the Gaussian mixture hidden Markov model are learned by an expectation maximization process.

11. The method of claim 1, in which the Gaussian mixture hidden Markov model is a left-to-right model.

12. The method of claim 1, in which the traffic events are classified as super congestion, heavy congestion, light congestion, open, and near empty.

13. The method of claim 12, in which the classes of traffic events are determined using a Viterbi process.

14. The method of claim 1, in which a confidence score is determined for each detected traffic event.

* * * * *